(12) United States Patent
Kasrawi et al.

(10) Patent No.: US 12,398,806 B1
(45) Date of Patent: Aug. 26, 2025

(54) HIGH DEFLECTION RADIAL SHAFT SEAL

(71) Applicant: VRC Intermedco Inc., Milwaukee, WI (US)

(72) Inventors: Bashar Kasrawi, Portland, OR (US); Kenneth Lamb, Vandalia, IL (US); Ben Linder, Vandalia, IL (US); Brian Knox, Milwaukee, WI (US); Dean Larsen, Milwaukee, WI (US)

( * ) Notice: Subject to any disclaimer, the term of this patent is extended or adjusted under 35 U.S.C. 154(b) by 0 days.

(21) Appl. No.: 18/313,737

(22) Filed: May 8, 2023

(51) Int. Cl.
*F16J 15/3248* (2016.01)
*F16J 15/3224* (2016.01)
*F16J 15/3232* (2016.01)

(52) U.S. Cl.
CPC ....... *F16J 15/3232* (2013.01); *F16J 15/3248* (2013.01); *F16J 15/3224* (2013.01)

(58) Field of Classification Search
CPC .. F16J 15/3216; F16J 15/3224; F16J 15/3232; F16J 15/324; F16J 15/3244; F16J 15/3248; F16J 15/3284
USPC ................................................. 277/561, 569
See application file for complete search history.

(56) References Cited

U.S. PATENT DOCUMENTS

| | | | | | |
|---|---|---|---|---|---|
| 2,482,029 | A | * | 9/1949 | Reynolds | F16J 15/3224 277/504 |
| 3,941,396 | A | * | 3/1976 | Bailey | F16J 15/3204 277/561 |
| 4,212,477 | A | * | 7/1980 | Ludwig | F16J 15/32 277/577 |
| 4,274,641 | A | * | 6/1981 | Cather, Jr. | F16J 15/322 277/561 |
| 4,383,691 | A | * | 5/1983 | Potter | F16J 15/3204 277/569 |
| 4,526,385 | A | * | 7/1985 | Wheeler | F16J 15/3208 277/910 |
| 7,419,165 | B2 | * | 9/2008 | Toth | F16J 15/3264 277/569 |
| 7,832,100 | B2 | * | 11/2010 | Toth | F16J 15/3264 29/888.3 |
| 7,887,062 | B2 | * | 2/2011 | Dahlheimer | F16J 15/3276 277/572 |
| 7,963,526 | B2 | * | 6/2011 | Dahlheimer | F16J 15/324 277/564 |
| 2008/0258406 | A1 | * | 10/2008 | Dahlheimer | F16J 15/3276 277/569 |
| 2008/0284110 | A1 | * | 11/2008 | Dahlheimer | F16J 15/3224 277/551 |

(Continued)

*Primary Examiner* — Nicholas L Foster

(57) ABSTRACT

A high deflection, radial seal for sealing a rotating shaft includes an annular mounting member including a primary seal lip having an annular sealing surface for sealing against an outer surface of the rotating shaft; an annular spring engages and energizes the annular mounting member and an inner annular ring is over-molded in the annular mounting member and aligned concentric with the annular sealing lip and the inner annular ring engages and seals the rotating shaft and the inner annular ring includes a plurality of cross holes along an inner circumference and located axially between the annular sealing lip and the annular ring. The annular member further includes a convoluted member extending radially and axially and including a static side member extending axially from the convoluted member; and an outer annular ring over molded on an outer side of the static side member of the annular mounting member.

9 Claims, 3 Drawing Sheets

(56) References Cited

U.S. PATENT DOCUMENTS

2019/0145421 A1\* 5/2019 Kung .................... F04D 29/128
415/111

\* cited by examiner

HIGH DEFLECTION RADIAL SHAFT SEAL

FIELD

The present disclosure relates to a high deflection radial shaft seal. More particularly, the present disclosure relates to an improved high deflection radial shaft seal for use with fracking pumps to radially seal a rotating shaft passing through a housing for sealing a liquid fluid side and an air side, the design of the disclosed high deflection seal provides for improved performance and capability to operate at higher degrees of deflection than prior seal designs.

BACKGROUND

The statements in this Background section merely provide background information related to the present disclosure and may not constitute prior art.

The disclosure relates to a radial shaft seal having a metal housing having an outer surface diameter and a flexible material, convoluted member, over-molded on the housing and including a primary lip seal for engaging and sealing an outer surface of a round, rotating shaft. The primary elastomer lip is energized by a metal garter spring and may also feature an axial excluder. The primary lip seal may also feature a thermoplastic ring insert to quickly respond to high deflection and misalignments of the shaft and keep the sealing lip in contact and prevent leakage.

Radial shaft seals are commonly provided for sealing between a housing and a rotary shaft passing through the seal mounted in a housing. One problem with radial shaft seals is that shaft offset or other misalignment and/or dynamic run out conditions relative to the housing bore can cause a seal lip to be unable to follow and seal the rotating shaft thereby allowing fluid to escape and leak past the radial shaft seal. Accordingly, the present disclosure provides a radial shaft seal capable of accommodating larger amounts of shaft misalignment, radial offset, and dynamic run out to maintain the seal with the rotating shaft.

What is still needed is an improved higher deflection seal design which may address known deficiencies and limitations of the prior art designs while improving the performance, amount of energy and noise produced by the high deflection seal. The disclosure and contents of U.S. Pat. No. 7,887,062 incorporated herein.

SUMMARY

In one aspect of the present disclosure, there is disclosed and detailed a high deflection, radial seal for use with sealing a rotating shaft, the seal including an annular mounting member including a primary seal lip having an annular sealing surface for sealing against an outer surface of the rotating shaft; an annular spring for energizing the annular mounting member and thereby energizing the annular sealing surface to engage with the outer surface of the rotating shaft; an inner annular ring over-molded in the annular mounting member aligned concentric with the annular sealing lip and spaced axially therefrom, the inner annular ring for engaging and sealing the outer surface of the rotating shaft; wherein the inner annular ring further includes a plurality of cross holes along an inner circumference and located axially between the annular sealing lip and the annular ring; wherein the annular member further includes a convoluted member extending radially and axially and including a static side member extending axially from the convoluted member; and an outer annular ring over molded on an outer side of the static side member of the annular mounting member.

In one aspect, the high deflection, radial seal wherein the convoluted member has a generally u-shaped configuration having a bight portion having an opening end aligned in a direction axially away from the sealing lip.

In one aspect, the high deflection, radial seal wherein the convoluted member has a generally u-shaped configuration having a bight portion having an opening end aligned in a direction axially toward the sealing lip.

In one aspect, the high deflection, radial seal wherein the convoluted member further comprises an axial excluder lip extending substantially axially proximal the annular ring and, in a direction, axially opposite the sealing lip.

In one aspect, the high deflection, radial seal wherein the sealing surface of the inner annular ring includes a first rib extending axially at an angle offset from the axis of the seal.

In one aspect, the high deflection, radial seal wherein the sealing surface of the inner annular ring includes a second rib extending axially at an angle offset from the axis of the seal and substantially normal to the first rib.

In one aspect, the high deflection, radial seal wherein the sealing surface of the inner annular ring includes a plurality of first ribs extending axially at an angle offset from the axis of the seal.

In one aspect, the high deflection, radial seal wherein the sealing surface of the inner annular ring includes a plurality of second ribs extending axially at an angle offset from the axis of the seal.

In one aspect, the high deflection, radial seal wherein the sealing surface of the inner annular ring includes alternating pluralities of first ribs and pluralities of second ribs extending radially around the sealing surface of the inner annular ring.

In one aspect, the high deflection, radial seal wherein the sealing surface of the inner annular ring includes at least three pluralities of first ribs and at least three pluralities of second ribs alternating radially around the sealing surface of the inner annular ring.

BRIEF DESCRIPTION OF THE DRAWINGS

The drawings described herein are for illustration purposes only and are not intended to limit the scope of the present disclosure in any way.

DETAILED DESCRIPTION

Figure 1:
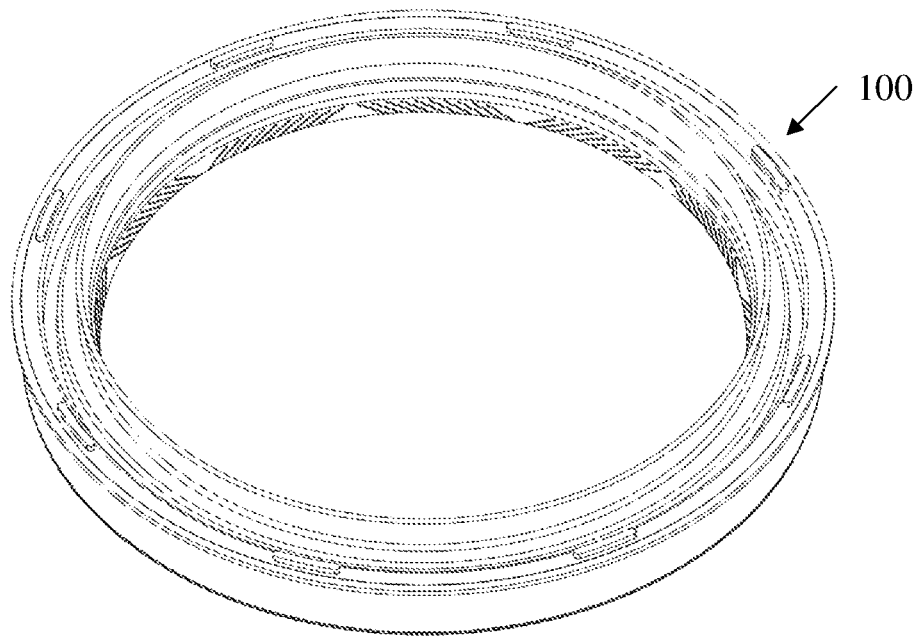
FIG. 1 illustrates a perspective view of a high deflection seal according to the present disclosure.

This detailed description is intended to be exemplary in nature and is not intended to limit the present disclosures, applications, or uses. Referring generally to all of the Figures and in particular to FIGS. 1 through 3, there is shown a perspective view of a high deflection, radial shaft seal (or just "seal" for brevity) 100 according to an embodiment of the present disclosure. Seal 100 may have a generally ring-like, overall shape for coupling to, supporting and sealing a dynamic, rotating shaft including sealing the shaft during operation where the shaft will angularly and/or axially deflect from a center or design operating position.

The sealing function of seal 100 may be primarily performed by a primary seal lip 1 which may run against and seal an outer radial surface of a shaft 3. Seal lip 1 may be energized by a metallic garter spring 2 located concentrically on an outer surface of and proximal seal lip 1 which helps to prevent and/or limit any loss of the sealing force of seal lip 1. In particular, over time and heavy duty and consistent use of seal 100, the garter spring 2 helps insure that as the material of seal lip 1 degrades through use it further maintains contact of seal lip 1 and a seal with the shaft 3.

Seal lip 1 is designed to have a diametrical interference fit with the shaft 3. The amount of the diametrical interference fit varies depending on the diameter size of the shaft 3. For smaller diameter shafts, a lesser amount of interference fit is designed than for larger diameter shafts which may be designed to have a greater amount of diametrical interference. In one particular embodiment wherein, the shaft has a four inch (4") diameter, then seal lip 1 will be designed to have approximately a 0.060" diametrical interference with the outer surface of the shaft 3. Seal lip 1 may preferably be made from a rubber material and may most preferably be made from nitrile, carboxylated-nitrile, hydrogenated nitrile, fluorocarbon, ethylene propylene diene monomer, or flouro silicone elastomers. Seal lip 1 is a part or portion of an integrated or unitary part as explained below.

Seal 100 may also include a ring 4 having an inner surface for also contacting the radial outer surface of a shaft 3 (see FIG. 2) and quickly responds to the shaft's 3 radial and angular movements. Ring 4 is preferably made from a thermoplastic material and, in particular, is most preferably made from polyetheretherketone (often referred to as PEEK), a high strength performance engineering thermoplastic that performs well in hostile environments. The PEEK material grades offer good chemical and water resistance and can operate at high temperatures and may be used continuously at elevated temperatures (i.e., at least as high as 480° F. (250° C.)) and in hot water or steam without permanent loss in physical properties. Any material that can provide these or equivalent properties and performance for rigid body behavior and functioning as the primary seal lip 1 in the design position thereby achieving the necessary sealing results. Ring 4 may be secured or coupled relative to seal lip 1.

Figure 2:
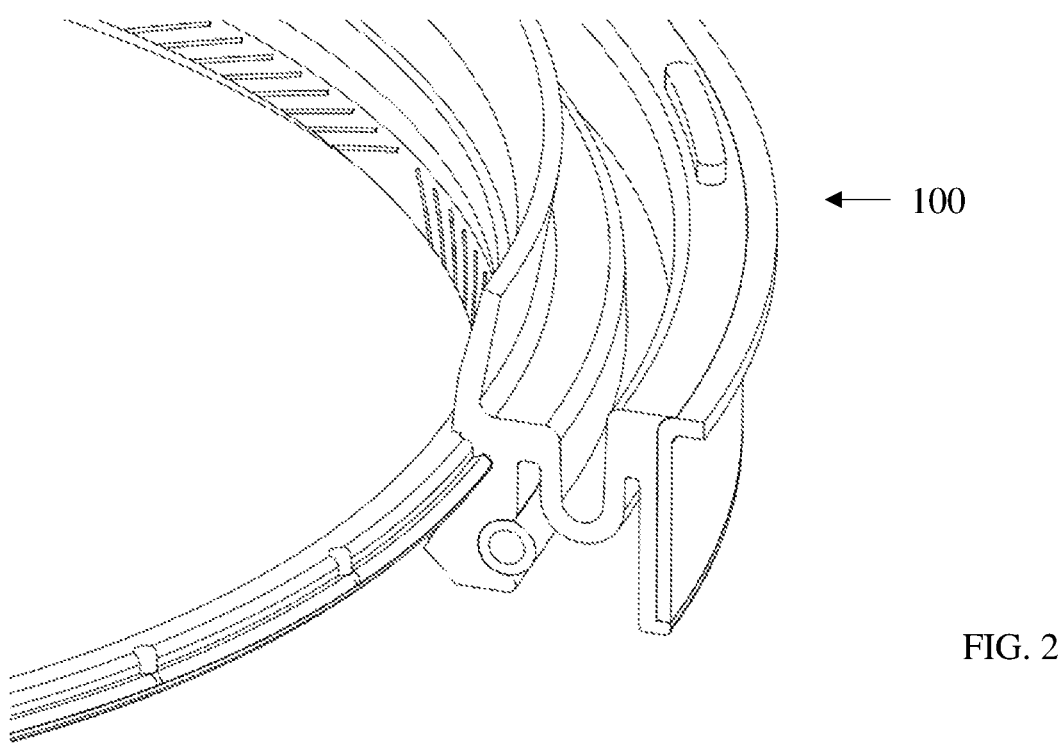
FIG. 2 illustrates a partial, cross-sectional, perspective view of the high deflection seal of FIG. 1.

Seal 100 may further include hydrodynamics aids 3 which function to provide for the back-pumping of the fluid that the seal 100 contains in the housing and that may leak past the primary seal lip 1. The hydrodynamics aids 3 may be located on the inner surface of ring 4 as best shown in FIGS. 1 and 2. Each hydrodynamics aid 3 may include a first rib extending from the inner surface of ring 4 and having an axis aligned substantially at an angle offset from the Center Line axis (C/L) of seal 100. In this aspect, the first rib is preferably offset from the Center Line axis by an angle of approximately seventy degrees (70°).

In one aspect, a second hydrodynamic aid 3 may include a second rib extending from the inner surface of the ring 4 and having an axis aligned substantially at an angle offset from the Center Line axis (C/L) of seal 100. In this aspect, the second rib is preferably offset from the Center Line axis by an angle of approximately seventy degrees (70°).

In one aspect, as best shown in FIG. 1, the sealing surface of ring 4 includes a plurality of first ribs extending axially at an angle offset from the Center Line axis of seal 100 and the sealing surface of ring 4 includes a plurality of second ribs extending axially at an opposite angle offset from the Center Line axis of seal 100. In one aspect, seal 100 includes a ring 4 having a sealing surface including radially alternating pluralities of first ribs and pluralities of second ribs. In this aspect, the sealing surface of the ring includes three pluralities of first ribs and three pluralities of second ribs.

Figure 3:
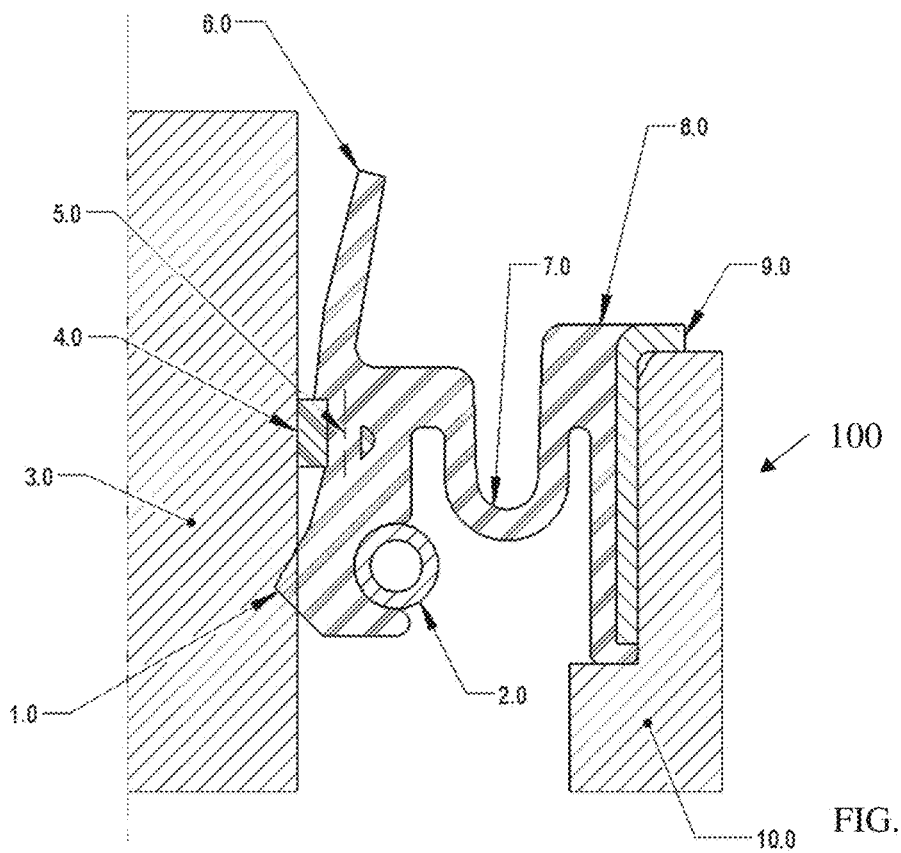
FIG. 3 illustrates a cross-sectional, plan view of the high deflection seal of FIG. 1.
Figure 4:
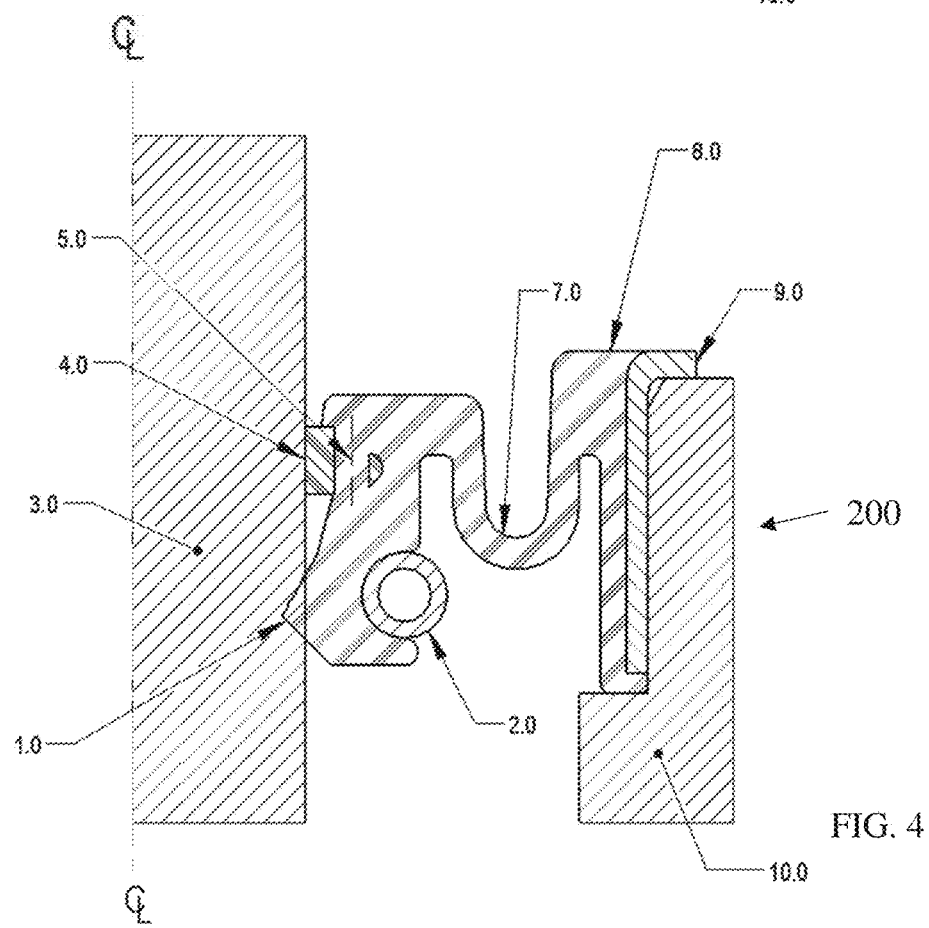
FIG. 4 illustrates a cross-sectional, plan view of an alternate high deflection seal according to the present disclosure.
Figure 5:
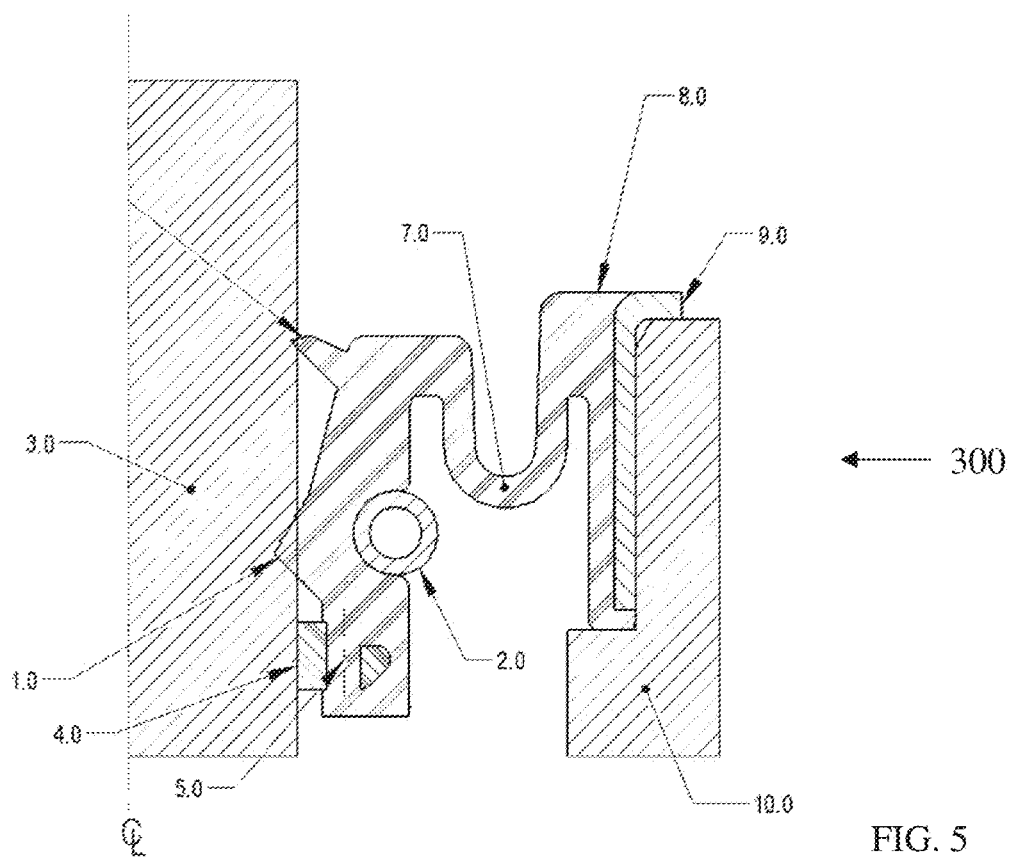
FIG. 5 illustrates a cross-sectional, plan view of a further alternate design of a high deflection seal according to the present disclosure.

In one aspect as shown in FIGS. 2-6, ring 4 may include a plurality of radially-spaced and axially extending (aligned with the Center Line axis of seals 100, 200, 300, and 400), cross-holes 5 to prevent rotation or slippage of ring 4 relative to seal lip 1. Cross-holes 5 may be located proximal to the outer circumference of ring 4. In one particular aspect, cross-holes 5 may be partial cross-holes 5 where a portion of cross-hole 5 is an opening in the outer circumference of the ring 4. This ensures that ring 4 will be mechanically bonded to seal lip 1 when the parts are over-molded together such that the material of seal lip 1 becomes located in cross-holes 5 of ring 4. Referring in particular to FIG. 3, it should be noted cross-hole 5 (shown in cross-section) includes upper and lower portions of cross-hole 5 that extend beyond the outer circumference of ring 4 and for a middle portion of cross-hole 5, the outer circumference of the ring 4 extends beyond cross-hole 5.

An axial excluder lip 6 extends axially in a direction upward and away from seal lip 1 and substantially aligned with the Center Line C/L axis. The excluder lip 6 serves as an exclusion device to the ingress of contaminants from the air side of seal 100 (FIGS. 1-3). In one aspect excluder lip 6 extends axially upward and away from ring 4 (in a direction opposite seal lip 1) and at an acute angle from the Center Line C/L axis. In one aspect, alternative design seals 200 and 400 do not include an excluder lip 6. See FIGS. 4 and 6. In one aspect, alternative design seal 300 of FIG. 5 includes an alternative design excluder lip 6 that projects toward shaft 3 and has a nominal diametrical interference with shaft 3 to provide an additional seal point between seal 300 and shaft 3.

In one aspect, each seal of the seals 100, 200, 300, and 400 may also include a convoluted member 7 for providing compliance and range of motion needed for relatively larger deflections, shaft-to-bore misalignments, and/or other eccentric movements of shaft 3 in the seals 100, 200, 300, and 400 during operation. Seals 100, 200, 300, and 400 each also include a convoluted member case 8 that extends substantially axially and is radially distal from seal lip 1 and may be integrally and unitarily over-molded as a single piece with seal lip 1, excluder lip 6, and convoluted member 7 as part of its over-molding forming on ring 4 and case 9.

Figure 6:
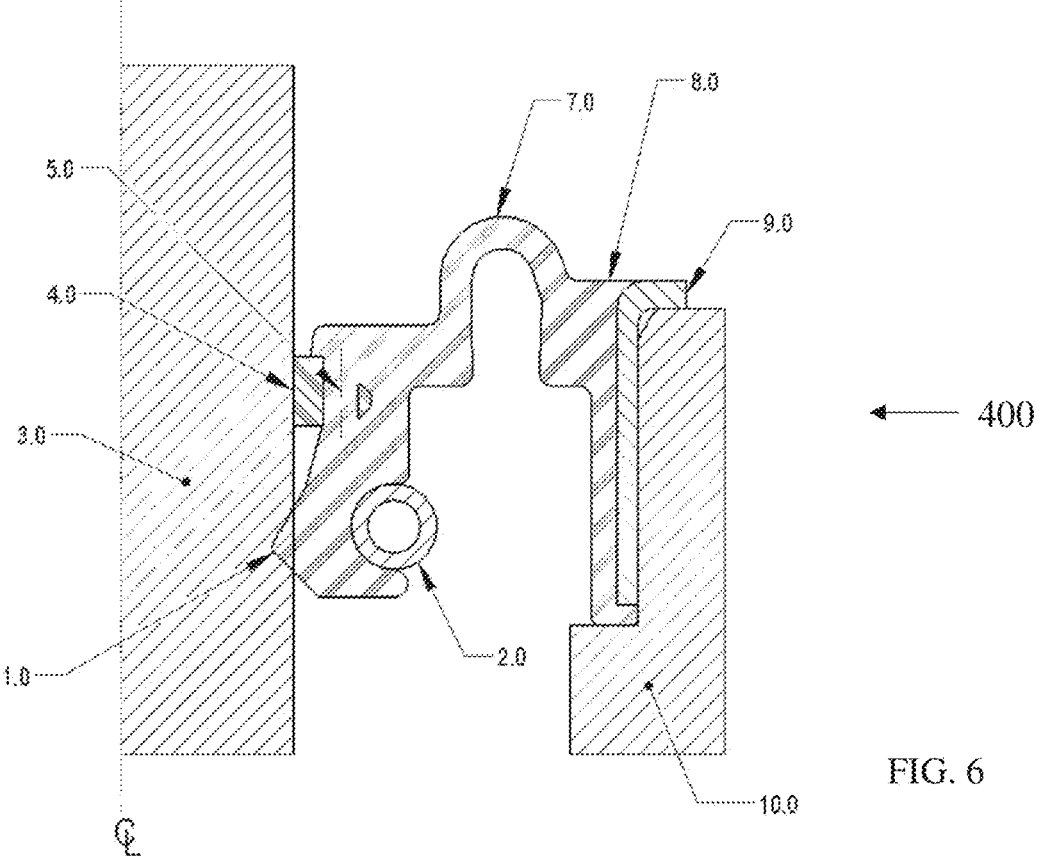
FIG. 6 illustrates a cross-sectional, plan view of an alternate high deflection seal according to the present disclosure.

Referring in particular to FIGS. 1-5, it is noted that the convoluted member 7 of seals 100, 200, and 300, each includes a central bight portion having a concave shape pointing upward in the Center Line C/L axis direction. Each leg of each bight portion extends first in the upward direction and then returns in the downward direction. The first bight leg radially proximal the axis includes seal lip 1 and axial excluder 6 (only seals 100 and 300). The second bight leg radially distal the axis includes convoluted case member 8. In one aspect as best shown in FIG. 6, convoluted member 7 of seal 400 is reversed and its concave bight portion faces axially downward. In this aspect, the legs of the central bight portion do not return axially as they directly include seal lip 1 and convoluted case member 8.

Referring in particular to FIGS. 3-6, seals 100, 200, 300, and 400 may be installed in a fracking pump housing 10 via a metal case 9. Case 9 is most preferably made of steel and functions as a static seal to couple each seal 100, 200, 300, and 400 within housing 10.

While aspects of the present disclosure have been illustrated and described, it is not intended that these aspects illustrate and describe every conceivable form of the present disclosure. Rather the words used in the specification are words of description rather than limitation, and it is understood that various changes may be made without departing from the spirit and scope of the present disclosure.

We claim:

1. A high deflection, radial seal for use with sealing a rotating shaft, the seal comprising:
   a. an annular mounting member including a primary seal lip having an annular sealing surface for sealing against an outer surface of the rotating shaft;
   b. an annular spring for energizing the annular mounting member and thereby energizing the annular sealing surface to engage with the outer surface of the rotating shaft;
   c. an inner annular ring over-molded in the annular mounting member aligned concentric with the annular sealing lip and spaced axially therefrom, the inner annular ring for engaging and sealing the outer surface of the rotating shaft; wherein the inner annular ring further includes a plurality of cross holes along an inner circumference and located axially between the annular sealing lip and a portion of the annular ring;
   d. wherein the annular member further includes a convoluted member extending radially and axially and including a static side member extending axially from the convoluted member and wherein the convoluted member has a generally u-shaped configuration having a concave portion having an opening end aligned in a direction axially away from the sealing lip; and
   e. an outer annular ring over molded on an outer side of the static side member of the annular mounting member.

2. The high deflection, radial seal of claim 1, wherein the convoluted member has a generally u-shaped configuration having a convex portion having an opening end aligned in a direction axially toward the sealing lip.

3. The high deflection, radial seal of claim 1, wherein the convoluted member further comprises an axial excluder lip extending substantially axially proximal the annular ring and in a direction axially opposite the sealing lip.

4. The high deflection, radial seal of claim 1, wherein the sealing surface of the inner annular ring includes a first rib extending axially at an angle offset from the axis of the seal.

5. The high deflection, radial seal of claim 4, wherein the sealing surface of the inner annular ring includes a second rib extending axially at an angle offset from the axis of the seal and substantially normal to the first rib.

6. The high deflection, radial seal of claim 4, wherein the sealing surface of the inner annular ring includes a plurality of the first ribs extending axially at an angle offset from the axis of the seal.

7. The high deflection, radial seal of claim 5, wherein the sealing surface of the inner annular ring includes a plurality of the second ribs extending axially at an angle offset from the axis of the seal.

8. The high deflection, radial seal of claim 7, wherein the sealing surface of the inner annular ring includes alternating pluralities of the first ribs and pluralities of the second ribs extending radially around the sealing surface of the inner annular ring.

9. The high deflection, radial seal of claim 8, wherein the sealing surface of the inner annular ring includes at least three pluralities of the first ribs and at least three pluralities of the second ribs alternating radially around the sealing surface of the inner annular ring.

\* \* \* \* \*